United States Patent [19]

Kaehler

[11] Patent Number: 5,128,672
[45] Date of Patent: Jul. 7, 1992

[54] DYNAMIC PREDICTIVE KEYBOARD

[75] Inventor: Edwin B. Kaehler, Palo Alto, Calif.

[73] Assignee: Apple Computer, Inc., Cupertino, Calif.

[21] Appl. No.: 606,014

[22] Filed: Oct. 30, 1990

[51] Int. Cl.$^5$ ............................................. H03M 11/00
[52] U.S. Cl. ..................................... 341/23; 340/711; 340/712
[58] Field of Search ........................ 341/23, 28; 400/91; 340/712, 711

[56] References Cited

U.S. PATENT DOCUMENTS

| | | | |
|---|---|---|---|
| 4,280,121 | 7/1981 | Crask | 340/712 |
| 4,333,097 | 6/1982 | Buric et al. | 340/711 |
| 4,633,227 | 12/1986 | Menn | 340/711 |
| 4,803,463 | 2/1989 | Sado | 341/23 |
| 4,823,311 | 4/1989 | Hunter | 340/712 |
| 4,853,888 | 8/1989 | Lata | 341/23 |
| 4,885,580 | 12/1989 | Noto et al. | 340/711 |

FOREIGN PATENT DOCUMENTS 0099536  6/1984  Japan ..................... 341/23

OTHER PUBLICATIONS

J. Becker, Aug. 1983, "User Friendy Design for Japanese Typing", Xerox Office Systems Division Report No. OSD T8301, p. 15.

D. A. Hamilton and A. A. Schwartz, Memory Arrangement Representing a Keyboard Having Both Fixed and Variable Characters, Feb. 1979.

Primary Examiner—Donald J. Yusko
Assistant Examiner—Michael Krakovsky
Attorney, Agent, or Firm—Timothy Casey

[57] ABSTRACT

A keyboard having the ability to predictively display different characters in association with its various keys within a variety of predefined character set layouts, based upon either the character preceeding an insertion point in a corresponding text field on a display or the last character entered from the keyboard is disclosed. Although each key of the keyboard is capable of displaying numerous different characters, each key represents only one character at a time and each character is displayed at only one key location. The user can also manually change character set layouts. When a user selects a particular key or selects an insertion point within the text field, all keys are updated to display a character set layout that corresponds to the set of characters from which the user would be most likely to want to select a character from next, based upon the frequency of that particular character combination being used in either a particular language or application. The organization of the characters within each character set layout is also based on the frequency of those characters being used in either a particular language or application. The keyboard can be implemented to operate as either a touch-sensitive display or as a collection of interactive images on any of a number of different displays. The keyboard can also be used in conjunction with the special function keys or buttons that are common to computer system for performing function-character command operations.

59 Claims, 10 Drawing Sheets

FIG_1
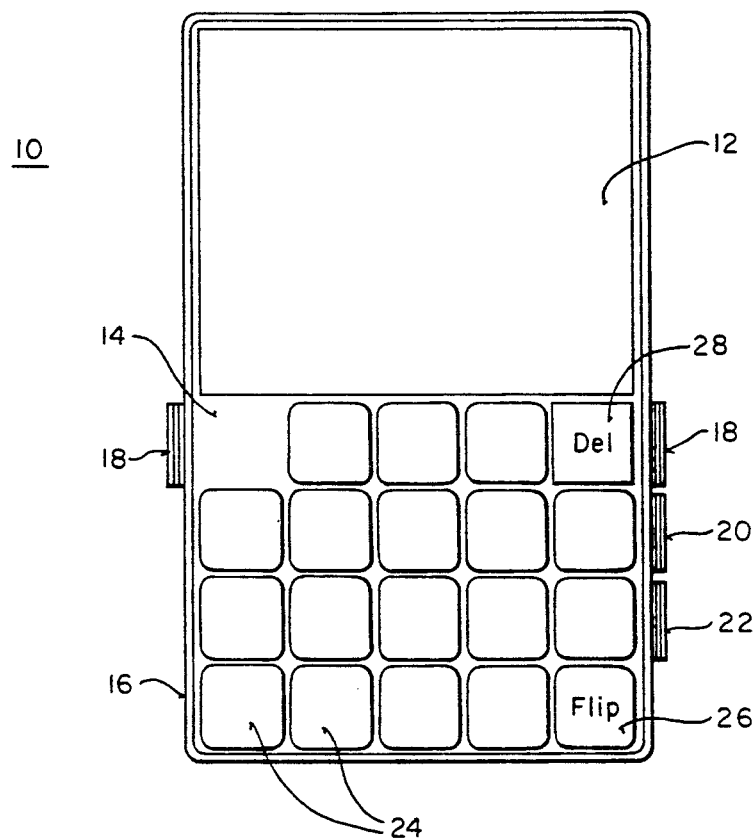
FIG_2
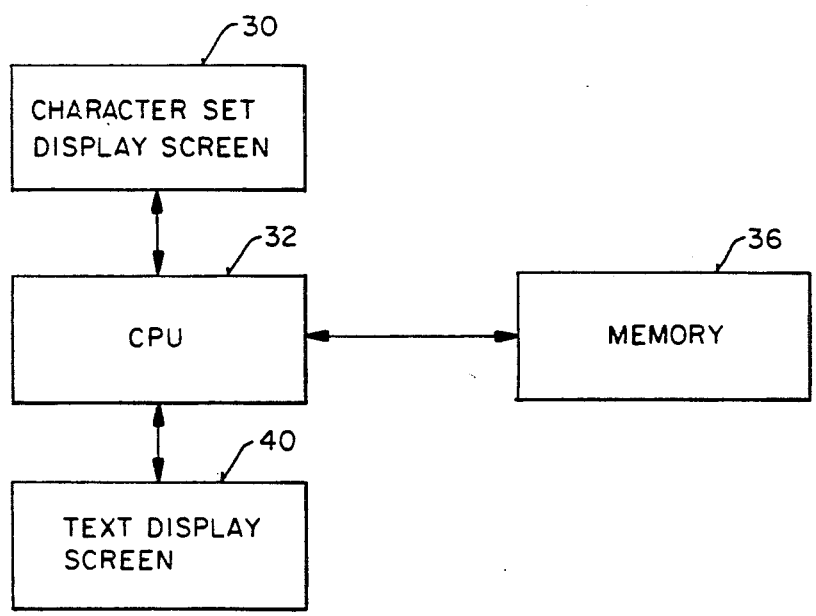

FIG_3A
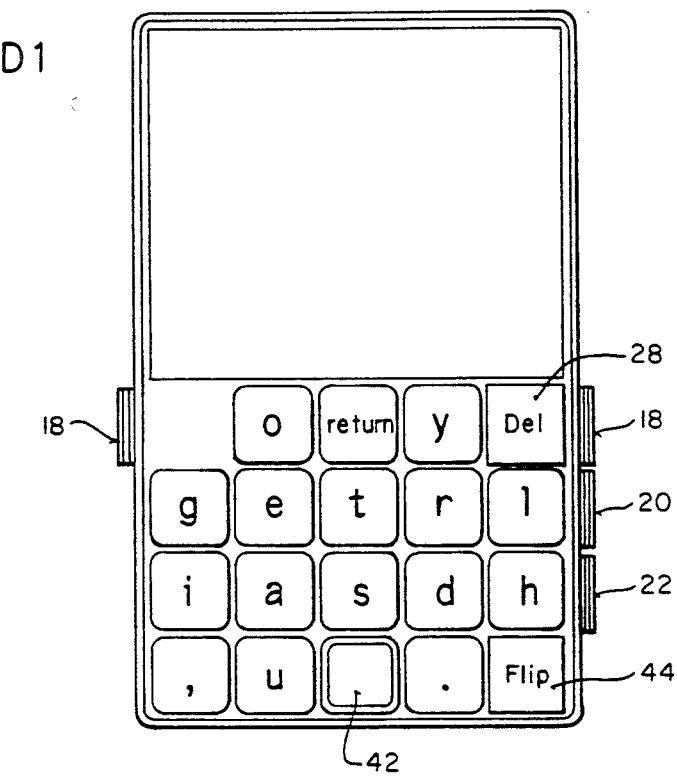
FIG_3B
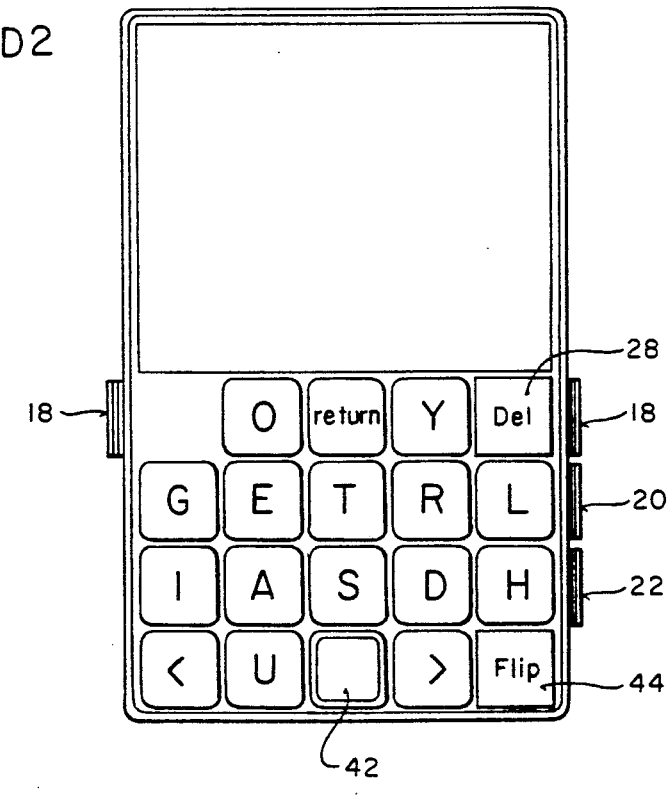

FIG_3C
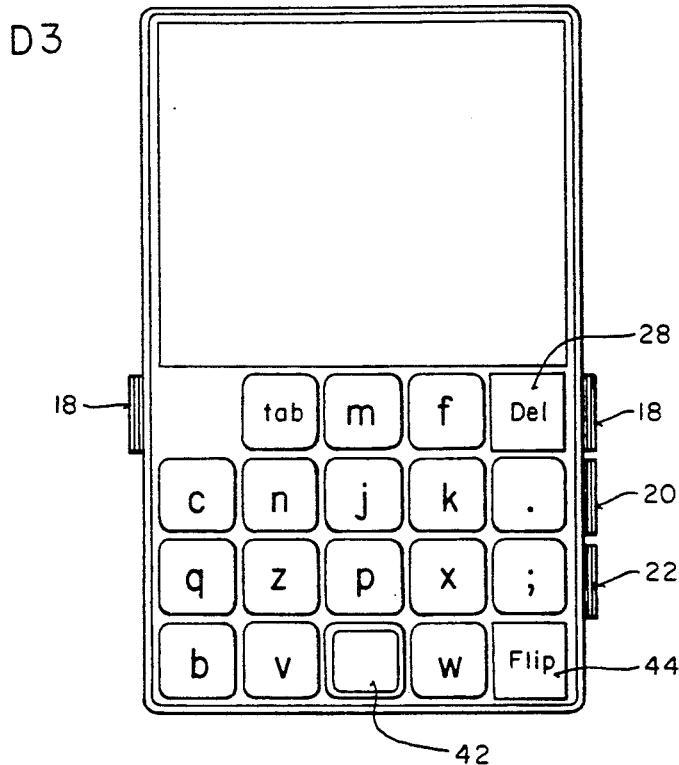
FIG_3D
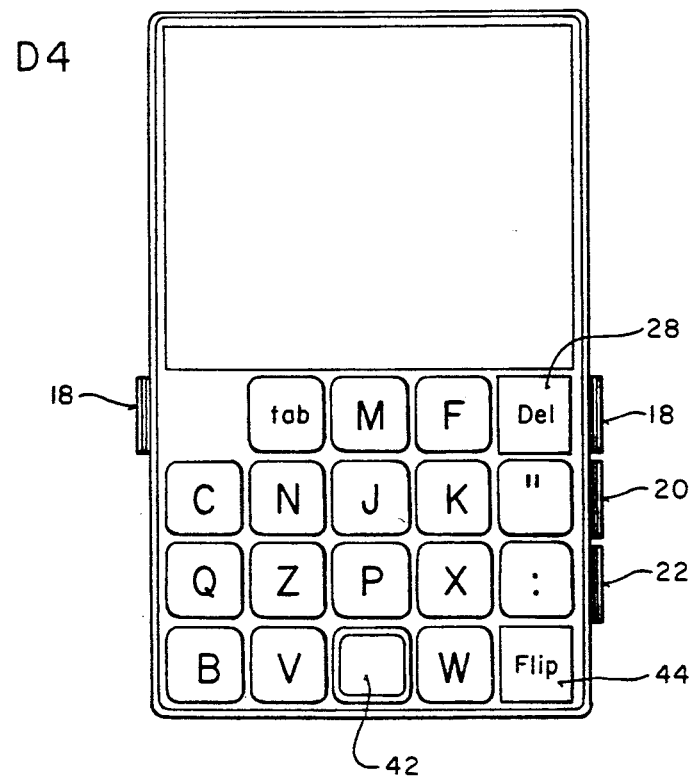

FIG_3E
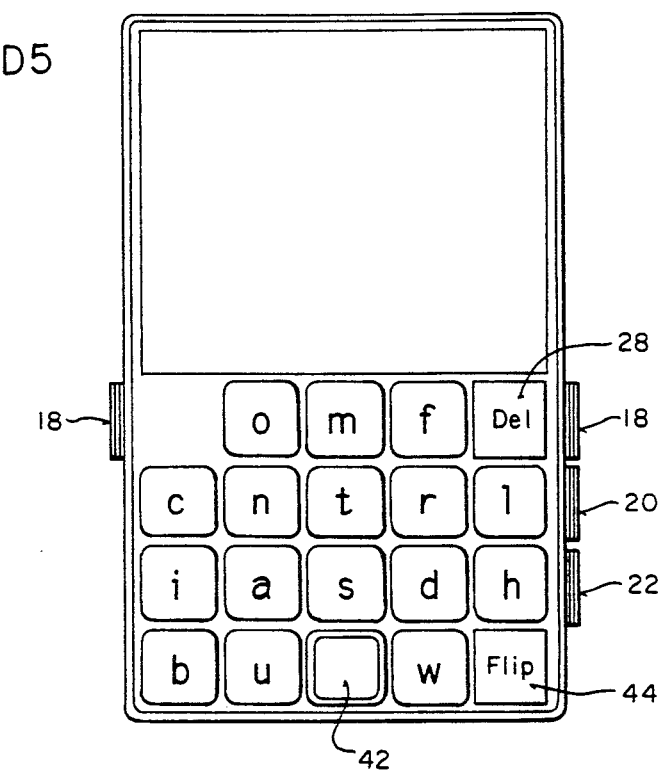
FIG_3F
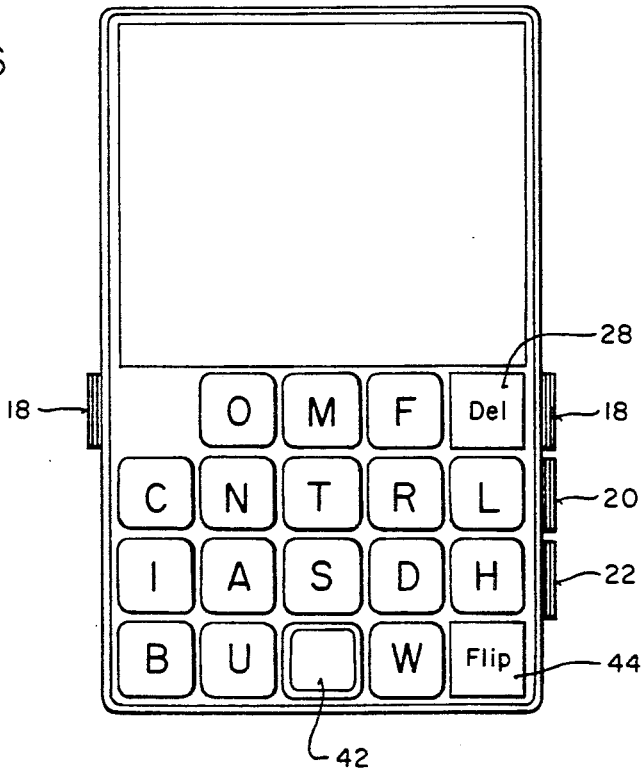

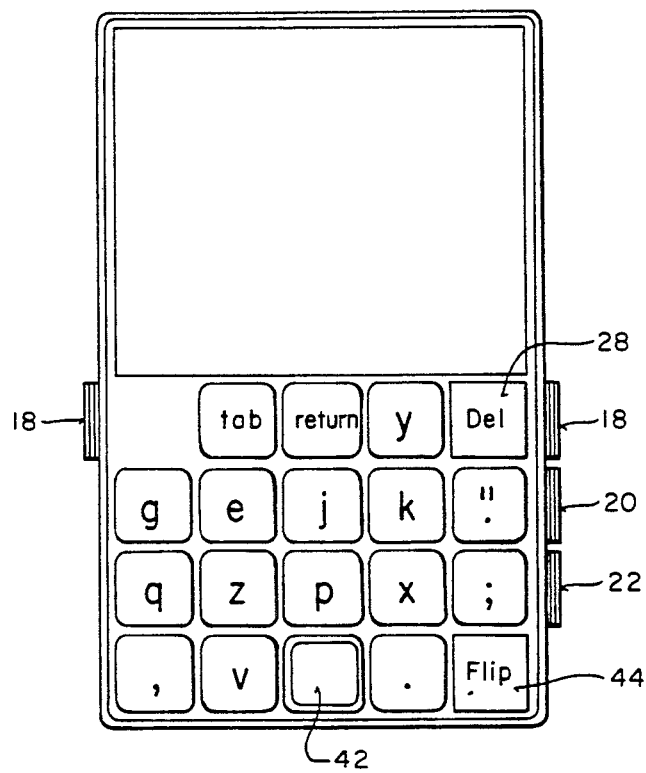
FIG_3G
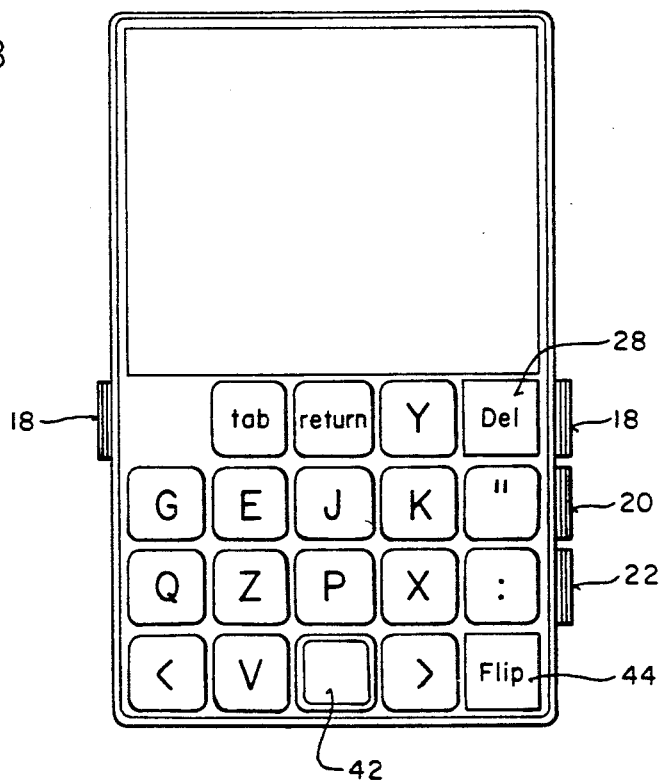
FIG_3H

FIG_3I
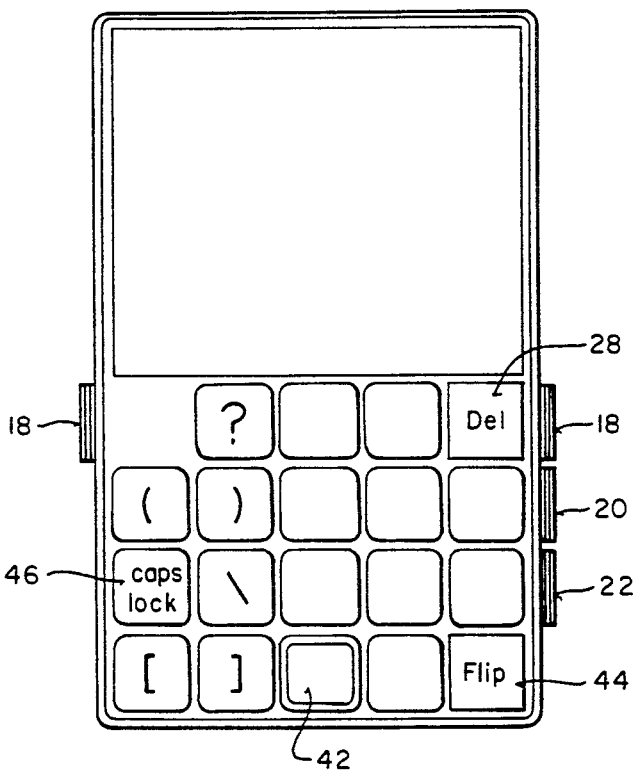
FIG_3J
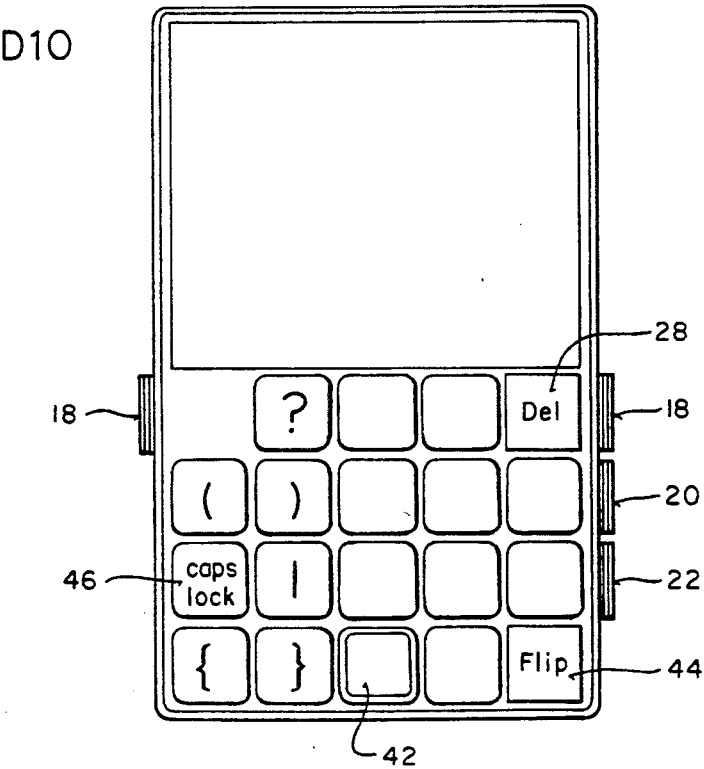

FIG_3K
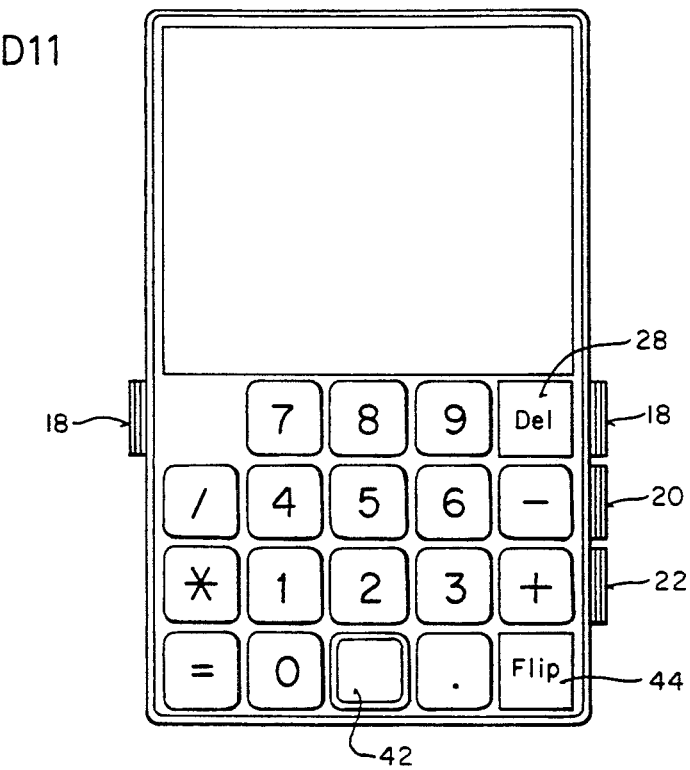
FIG_3L
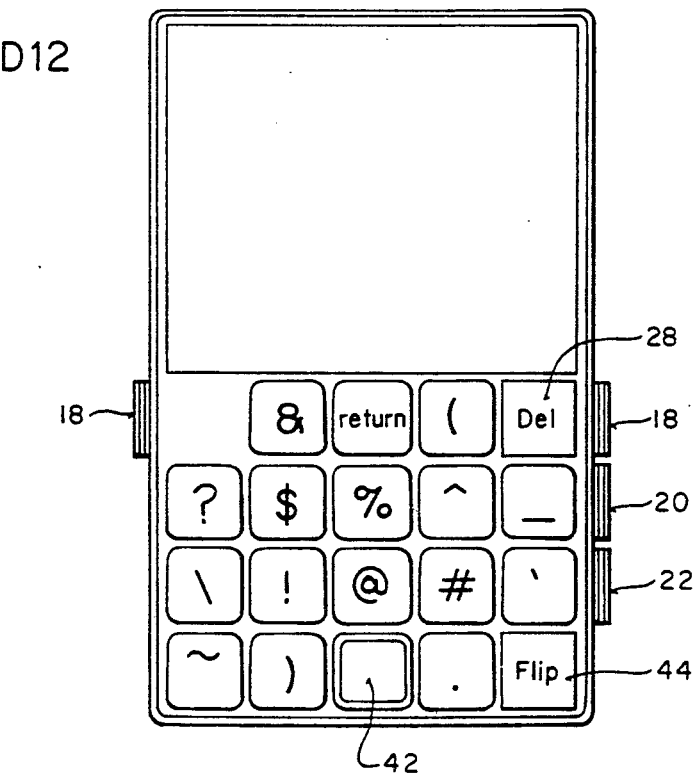

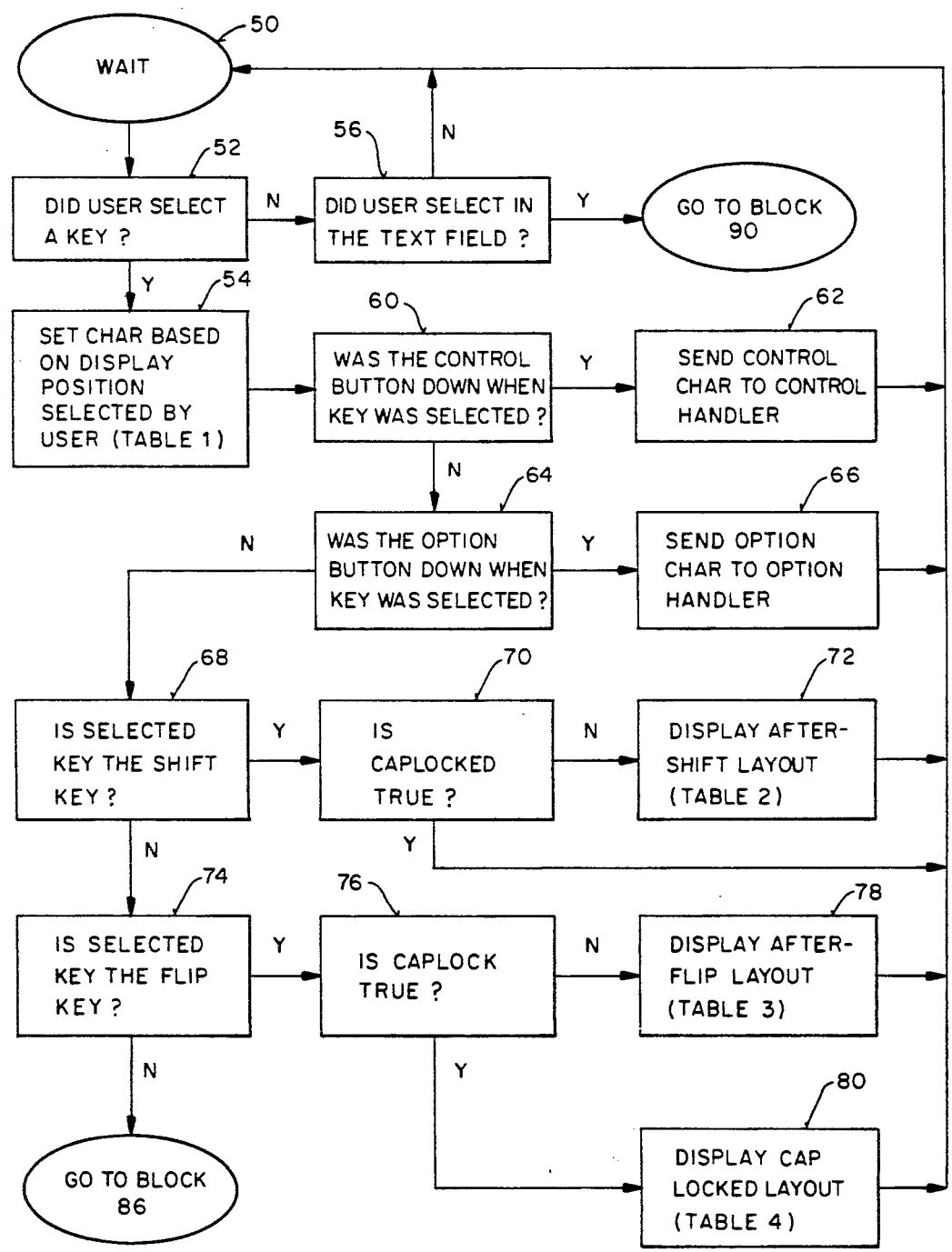

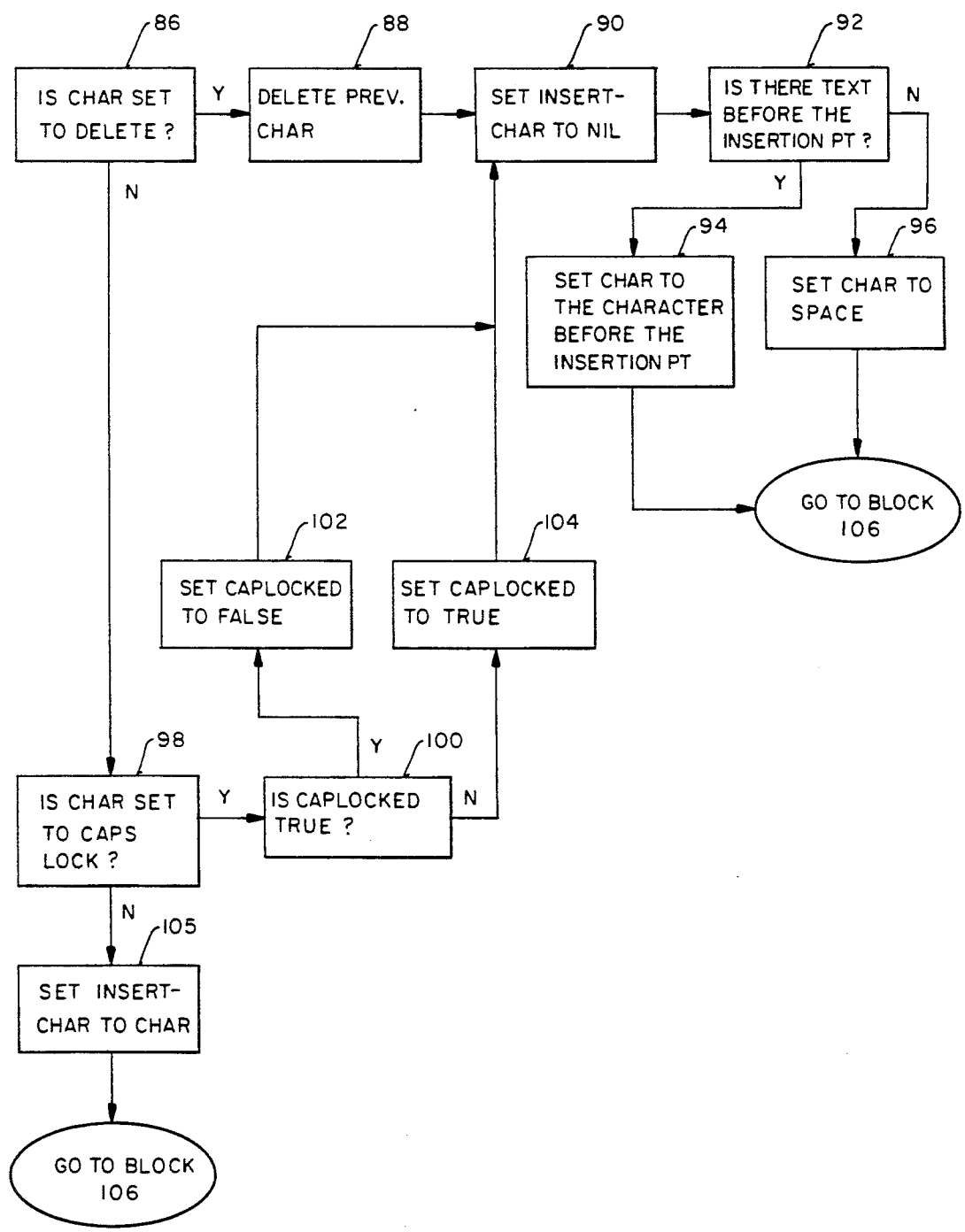
FIG_5

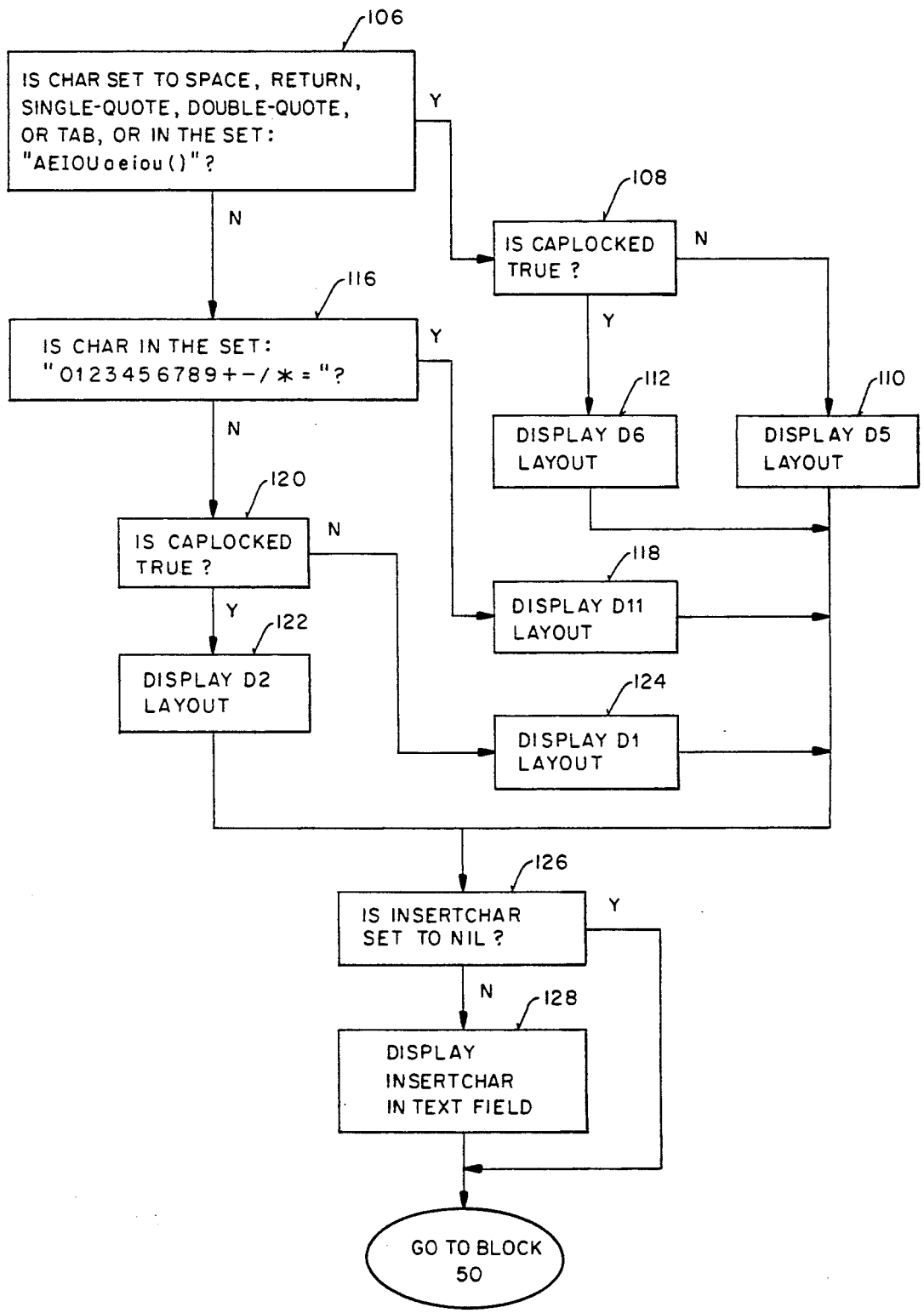

DYNAMIC PREDICTIVE KEYBOARD

FIELD OF THE INVENTION

The present invention relates generally to keyboards and touchpads, and more particularly to a keyboard for predictively displaying different character set layouts based upon the last character entered by the user from the keyboard or an insertion point entered in a corresponding text field on a display.

BRIEF DESCRIPTION OF PRIOR ART

As microprocessor based devices have been reduced in physical size, a great demand has arisen for keyboards and/or touchpads ("keyboards") which can be readily used with such devices, especially for the purpose of standard English text entry. Several schemes exist for encoding various alphabets on small keyboards for use with such devices, but these keyboards have not completely satisfied this demand. For example, a number of handheld electronic planner/calender products, produced by various Japanese manufactures, utilize different types of alphabetized keyboards for entering text. Although some of these keyboards follow the English character set layout popularized by QWERTY style keyboards ("QWERTY" stands for the organization of six letters on the second row of the keyboard), the size of the keys and the spacing between keys have been reduced to the point that the keyboards can no longer be used for rapid text entry. Users of such products are forced to use one or two fingers at a time to type text, which is typically referred to as the "hunt and pack" method of typing. The QWERTY layout has been used on most typewriters and computer keyboards and has become the generally accepted standard for touch typists. Small QWERTY layout keyboards are unacceptable because they force the use of the "hunt and peck" method of typing, which is inefficient and uncomfortable to touch typists. Attempts to modify the QWERTY layout have also met with little success, either because of the reduced key spacing or size, the bizarre arrangement of the characters in the layout, or the keystroke methodologyy employed.

Mitsubishi Corp. of Japan produces a cellular phone with a touchpad having three separate letters assigned to each of the keys, i.e., the key for the digit 2 has "ABC" as its letters. To select a letter, the user must press a digit between one to three times, depending on the letter to be selected. This technique requires an average of two keystrokes to be performed per letter.

A Federal Aviation Agency telephone interactive information system uses a touchpad that requires the user to first press the digit for a group of three letters, then indicate the letter to be selected from within the group by pressing a key in one of the three columns of keys, i.e., "1" for the first letter, "2" for the second letter, or "3" for the third letter. This scheme requires that at least two keystrokes be performed per letter.

In the mid-1960's, SRI International produced a chord keyset, having five piano like keys that could be pressed simultaneously to produce different characters. Each stroke of the keyset was a combination of the five keys that stood for that one letter. The user of the keyset was required to learn a completely arbitrary set of chords for the letters, and was unable to look at the keys if a combination for a letter was forgotten. Only 32 distinctive characters could be typed using the five keys.

U.S. Pat. No. 4,885,580, issued to Noto, et. al., describes a multi-function key input device having a fixed display section and a variable display section. The variable display section displays differing information, under the control of a central processing unit, for each of a number of different operating modes, which may be specified by selecting one or more of the fixed display keys.

There have also been numerous attempts to combine a standard key entry system with a display, so as to further reduce the amount of space required by the keyboard and to make the keyboard more dynamic. For example, a number of touch-sensitive displays, having dynamically interchangeable character set layouts, have been produced for use as keyboards. Although the character set layouts of such displays may be dynamically interchanges, the different character set layouts are only exchanged in response to specific user initiated commands.

A different type of dynamic keyboard, aimed at removing the need for finger repositioning, as required on standard keyboards, was forwarded in U.S. Pat. No. 4,333,097, issued to Buric, et. al. This patent describes a 10-key keyboard having blank keys for use in combination with one or more replicas of the 10 keys displayed on a CRT. The characters and organization of characters displayed within each replica row was determined by the relative frequency of usage of each character in common English and the strength of the operator's finger required to type each key in a row. To shift between the fixed-character rows on the display, the operator was required to push either an upshift or downshift button which would when cause the active replica row to shift up or down accordingly on the display. This approach was reported to require about 1.5 keystrokes per character typed.

Another type of dynamic keyboard is described in an article by Joe Becker, entitled "User Friendly Design for Japanese Typing", Xerox Office Systems Division Report No. OSD T8301, August 1983. The Becker article, at page 15, describes a virtual keyboard, like that of Buric, which was designed to reduce the number of hardware keys required to type a particular language. The software system which operated this virtual keyboard was implemented in a PC-based system named the Fuji Xerox 8012-J Star. The keyboard was developed to allow the average Japanese person to learn and use a PC for everyday typing. Such a keyboard was required because the Japanese script uses up to 6,000 Chinese ideograms (kanji), 170 Japanese syllabic characters (kana), various Roman letters, and Arabic numerals.

To operate the keyboard, a user would type a Japanese word, such as "shiyousareteiru", from a mechanical QWERTY-style keyboard, and then press a lookup key. The PC would then analyze the typed word and display several different Kanji characters corresponding to the phonetic word, such as the homophones "used", "tried out", "bred", eliminated", and "put to personal use", on a displayed replica of the mechanical keyboard. The keyboard replica did not, however, always exactly resemble the mechanical keyboard. For example, when a long word was to be displayed, the replica would combine a number of keys in a row into one long key so that the homophone could be displayed in an uninterrupted manner. To select the appropriate group of Kanji characters, the user would then press any of the keys assigned to a particular homophone. If more than eight homophones existed for the typed word, the user would need to press the lookup key again to have those words displayed. Frequency tables were implemented in this system so that the most frequently used homophones were always shown first. In addition, under this system, kanji words would always appear on the same keys, independent of their reading in a given context, thereby facilitating touch typing. Although Buric and Becker describe dynamic virtual keyboards, neither describe or suggest a reduced key dynamic keyboard capable of predicting a user's next move and providing a character set layout which corresponds to that prediction.

SUMMARY OF THE INVENTION

A preferred embodiment of the present invention comprises a keyboard having the ability to predictively display different key images in association with its various keys, within a variety of predefined sets of key images, based upon either the character preceding an insertion point entered in a corresponding text field on a display or the last key image entered from the keyboard. Although each key of the keyboard is capable of displaying numerous different characters, each key represents only one character at a time and each character is displayed at only one key. The user can also manually change character set layouts. When a user selects a particular key or selects an insertion point within the text field, all keys are updated to display a character set layout that corresponds to the set of characters from which the user would be most likely to select a character from next, based upon the frequency of the particular character combination being used in either a particular language or application. The organization of the characters within each character set layout is also based on the frequency of those characters being used in either a particular language or application. The keyboard can be implemented to operate as either a touch-sensitive display or as a collection of interactive images on any of a number of different displays. The keyboard can also be used in conjunction with the special function keys or buttons that are common to computer system for performing function-character command operations.

BRIEF DESCRIPTION OF THE DRAWING

FIG. 1 is a representation of a dynamic predictive keyboard, in combination with a hand-held display device, illustrating a partially blank character set display screen and a blank text display screen, in accordance with the preferred embodiment of the present invention;

FIG. 2 is a block diagram of a computer system for use with the dynamic predictive keyboard of the present invention;

FIGS. 3a through 3l are representations of the different character set layouts which can be displayed in accordance with a preferred embodiment of the present invention; and FIGS. 4, 5 and 6 illustrate a method for implementing the dynamic predictive keyboard of the preferred embodiment of the present invention.

DETAILED DESCRIPTION OF PREFERRED EMBODIMENT

A dynamic predictive keyboard, as used in combination with a handheld display device, and for use in such devices as calculators, computers, appointment books, inventory recorders, telephones and the like, is herein disclosed. The keyboard and the display device, generally shown as 10, are illustrated in FIG. 1. The display device is comprised of a text display screen 12, a character set display screen 14, and various well known electrical components required to operate those displays contained within the housing 16. Also connected to the housing 16 are shift buttons 18, on either side of the housing, a control button 20, and an option button 22. The keyboard of the present invention is displayed within the character set display screen 14 and includes a number of dynamic key locations 24 which can be variously controlled by the display device 10 to display different key images or characters within the display screen space allocated to each key. If desired, a number of the keys 24 can be set to display particular key images until reset. For example, as shown in FIG. 1, key 26 has been set to display the English word "Flip" and key 28 has been set to display the abbreviation "Del" for the English word "Delete".

It should be noted that although the keyboard and display device 10 are shown as an integrated handheld, touch sensitive unit throughout this description of the preferred embodiment, a keyboard having the basic elements of the present invention could also be displayed on any standard type of display, such as CRT or LCD, or incorporated into any environment where it was possible to dynamically change the character set layout corresponding to the keys. Although a separate display area should typically be reserved for the keyboard, the keyboard could be shown in the same area as the text when necessary. When the keyboard is utilized on the screen of a standard display using replicas of the keys and/or interative software-based images, the keys and buttons can be activated by a pointing device or cursor control device, such as a mouse. For example, control button image 20 could be selected by simply positioning the cursor over the button and depressing the selection button of the mouse to select the contrl function. Alternatively, a set of hardware key switches could also be used. In one embodiment, individual display elements would be positioned within each switch for displaying the different key images. In a second embodiment, the switches would be left blank, but the hardware keyboard would be operated in association with a display upon which replicas of the keys and the various key images could be projected.

Regardless of the manner in which the present invention is implemented, the basic operation of the keyboard system and the software and electronics which allow it to operate, can be described with reference to the block diagram of FIG. 2. The character set display screen 30 displays sets of the key images (character set layouts) that were selected to be displayed by the central processing unit (CPU) 32 and acts as an interface between the user and the keyboard system. In the preferred embodiment, the display device screens 30 and 40 are composed of touch sensitive overlay screens in combination with display units, the operations of which are well known to persons of ordinary skill in the computer arts. When a user selects a particular key or button from the character set display screen 30 or selects an insertion point from within the text field of the text display screen 40, a select signal corresponding to the selected character, function key or button, or the character preceding the insertion point, is output to the CPU 32 for processing. If the user selected a particular character to be displayed or a particular insertion point, the CPU 32 would analyze the select signal, determine (predict) the next character set layout to be displayed based upon that select signal (layouts are stored in memory 36), display the next character set layout in the character set display screen 30, and display the character corresponding to the select signal in the text display screen 40. Character definitions and character set layouts are drawn from memory 36 when appropriate. As previously stated, the designations for display screen 30 and display screen 40 could easily correspond to the same display screen if desired.

With reference now to FIGS. 3a through 3l, representations of the different character set layouts D1 through D12, which are shown in these figures as they would be displayed within the character set display screen 30 in accordance with the preferred embodiment of the present invention, are shown. As explained above with reference to the prior art, the standard English language keyboard for typing is the QWERTY keyboard. The QWERTY keyboard has a total of forty nine keys, including Shift and Return (or Enter) character keys, but not including Tab, Caps Lock, or Delete character keys, and not including any of the other character keys which are commonly used on computer keyboards, such as Control, Option, Function 1 through 15, etc. These forty nine keys, together with the shift key, allow users to type all 26 letters of the English language, in both upper and lower case, the 10 digits of our standard numbering system, the 32 punctuation marks and symbols most commonly used in English, and Space, Backspace, Return, and Tab.

An object of the present invention is to reduce the number of keys required on a keyboard, thereby reducing its size, without significantly increasing the number of keystrokes (typed keys) required to type all of the characters of the QWERTY keyboard. The present invention meets this objective by providing a keyboard having a minimal number of keys while providing all of the characters of a QWERTY keyboard and minimizing the number of keystrokes to type the characters of the QWERTY keyboard. In the present invention, unlike a standard fixed keyboard, some if not all of the keys are dynamic, in that they have the ability to display different characters while the keyboard is in use. Hence, each key may represent several letters, digits, or symbols. Although different arrangement are quite possible, each key typically only represents a single character at a time and each character is typically only displayed at one key location. In addition, the user has the ability to manually cause the set of characters being displayed to change, such as by selecting either the Shift, Flip or Delete characters, which are fixed characters further described below, or to predictively change the character set layout by simply selecting a character to be typed.

When a user selects a key, all of the keys are updated to display the set of characters which would most likely be used by the user to type another character. The choice of what character set layout to display next is based on the frequency of character combinations typically used by the machine or the particular application with which the keyboard is being used. For example, in the preferred embodiment of the present invention, as implemented in English, one particular character set layout is displayed after the user types a consonant and another is displayed after the user types a vowel. Character set layouts could also be based on exactly which letter was typed last, which would yield some twenty-six or more character set layouts. The order of these layouts can either be based on statistics relating to the particular language being used, which is further explained below, or on specific applications running on the particular machine with which the keyboard is being used.

By typically displaying each character at only one key location, a user can gradually learn where each of the characters should appear, thereby aiding in the development of touch typing with the keyboard. This is also true because each specific sequence of letters always has the same sequence of keystrokes. For example, the word "computer" may always be typed "c-o-m-Flip-p-u-t-e-r", which allows the user to consciously or subconsciously learn to type sequences of keystrokes for words, as do touch typists. The word "Flip" refers to the Flip key 26 of FIG. 1, which can be selected by the user to cause the keyboard to manually change character set layouts. In the example, the user knew that a "p" would not automatically appear after the "m" was typed, so that user pressed the Flip key to manually cause a character set layout having the "p" character to appear. The only letter that was not predicted in the example was the letter "p", hence, the Flip key only had to be pressed once.

The layout of the character sets and organization of the layouts for the preferred embodiment of the present invention were determined using a statistical analysis. The purpose of this analysis was to calculate the frequency of various letter combinations in the English language so as to derive character set layouts which would represent the most likely characters to be used. A database of standard text was analyzed to determine which characters were most commonly used amongst all of the characters of a QWERTY keyboard. The most commonly occurring characters were then analyzed using the same database to determine which characters were most likely to follow each of the most commonly occurring characters. This same analysis format was then repeatedly used to determine the most common characters following different sets of characters, vowels, consonants, etc., until the character sets D1 through D12 of the preferred embodiment were derived. Through careful selection of the character sets to display after each keystroke, the number of Flips or switches required to produce a desired character can be kept low. For example, out of a sample of 130,880 characters, it was determined that only 18,800 flips, or 14.36% extra keystrokes, were required to enter the text using the character set layouts of the preferred embodiment. Hence, for typical English text or numeric input, fewer than 20% of the user's keystrokes would be Flips, resulting in fewer than 1.2 keystrokes per letter typed.

This same analysis can equally be applied to diffferent languages, different usages within a particular languagek, or other particular applications, so as to derive character set layouts which provide the greatest efficiency (the least number of keystrokes per character). Hence, because the type of text being typed may cause the most commonly required keystrokes to change, the character set layouts of FIGS. 3a–3l are only presently believed to be the best mode of practicing the present invention with respect to the English language as used at this time. It is impossible to say whether these character set layouts represent the optimum arrangement of characters possible in every instance or will continue to do so in the future. For example, in the above mentioned sample, the largest contribution to the number of flips required was caused by typing a "p" after a space, which accounted for 583 flips. Hence, in some instances, it may be necessary to switch one or more of the characters on the character set layout D1, which forms the first layout displayed, with different characters, such as a "p", so as to reduce the number of keystrokes required to reach that particular character. It is therefore highly desirable to provide a user with the ability to individually select the composition and order of character set layouts.

The composition and order of character set layouts may be selected in many different manners. Some users may wish to establish character set layouts in their own particular fashion, while others may wish to simply use an initial default layout which can be subsequently modified according to various feedback data relating to previously selected key images, or actions performed by the keyboard or controlled device as a result of key image selections. For example, a processor performing the predictive operations of the keyboard could be programmed to suggest different character set layouts after a user had used the keyboard while set in a default mode over a first period.

In the character set layouts of the preferred embodiment, illustrated in FIGS. 3a-3l, three particularly important keys, the "Delete" key 28, the "Return" key 42 and the "Flip" key 44, were added as fixed characters within each of the twelve character sets. The "Shift" key could also be added as fixed character to these character sets, rather than as the button depicted in FIGS. 1 and 3, if a particular embodiment did not support buttons. The Flip key, as briefly described above, provides the user with the ability to switch between difference character set layouts when a desired key is not found to be immediately available on the layout present being displayed.

Returning now to the actual composition of the layouts D1 to D12, it should be noted that layouts D1, D3, D5, D7, D9 and D11 correspond to all of the lower case characters from the QWERTY keyboard and that layouts D2, D4, D68 D8, D10 and D12, which match the character set layouts of the odd numbered character set layouts, corresponding to all of the upper case characters from the QWERTY keyboard. The character set layouts are displayed within the character set display screen 14 so that layout D1 is the default layout. The basic rules for determining which of the character set layouts are to be displayed after a keystroke are as follows:

(1) After the user types any vowel, Space, Return, Tab, Single Quote, Double Quote, ")" or "(", then character set layout D5 is to be displayed.

(2) After the user types any character in the set "0123456789+ —/*=", then character set layout D11 is to be displayed.

(3) After the user types any remaining character, then character et layout D1 is to be displayed.

Additional rules, which will be explained below with reference to Tables 2,3 and 4, apply after the user types a Shift key 18, a Flip key 44, or the "Caps Lock" key 46.

With reference now to FIGS. 4 through 6, the operation of the keyboard in association with the display device 10, or any dynamic predictive keyboard, is described. FIG. 4 illustrates a first portion of a method for implementing the dynamic predictive keyboard in accordance with the preferred embodiment of the present invention, and in particular with respect to a method for handling select signals corresponding to functional icons representing Control and Option commands and Shift and Flip key selections. When the display device 10 is activated, the electronics system associated with the device, as generally described in FIG. 2, initially starts off by waiting, block 50, for the user to either select a character key 24 or select an insertion point within the text field of the text display screen. Upon receiving a select signal, the system first asks whether that signal was generated as a result of the user selecting one of the keys 24 from within the display screen 30, block 52. If the user did select a key, the row and column of the display corresponding to that key, and therefore its corresponding character or functional icon, are reported to the CPU as the select signal. The CPU then sets a variable named "CHAR" based on the reported display position selected by the user, block 54. The value assigned to the CHAR variable corresponds to a position within a look-up table stored in member 36 containing data for creating images on the text display corresponding to selected characters. A look-up table in accordance with the preferred embodiment of the present invention, corresponding to a keyboard having a maximum of four rows and five columns of keys, and corresponding to the character set display screens illustrated in FIGS. 3a through 3l, is shown below in Table 1, with corresponding rows from the display running from top to bottom and corresponding columns from the display running from left to right.

TABLE 1

|  |  | Row | 1 | 1 | 1 | 1 | 2 | 2 | 2 | 2 | 2 | 3 | 3 | 3 | 3 | 3 | 4 | 4 | 4 | 4 | 4 |
|---|---|---|---|---|---|---|---|---|---|---|---|---|---|---|---|---|---|---|---|---|---|
|  |  | Col | 2 | 3 | 4 | 5 | 1 | 2 | 3 | 4 | 5 | 1 | 2 | 3 | 4 | 5 | 1 | 2 | 3 | 4 | 5 |
| Character | D1 | o |   | y | Δ | g | e | t | r | l | i | a | s | d | h | , | u |   | . | f |
| Sets | D2 | O |   | Y | Δ | G | E | T | R | L | I | A | S | D | H | < | U |   | > | f |
|  | D3 |   | m | f | Δ | c | n | j | k | ' |   | q | z | p | x | ; | b | v |   | w | f |
|  | D4 |   | M | F | Δ | C | N | J | K | " |   | Q | Z | P | X | : | B | V |   | W | f |
|  | D5 | o | m | f | Δ | c | n | t | r | l | i | a | s | d | h | b | u |   | w | f |
|  | D6 | O | M | F | Δ | C | N | T | R | L | I | A | S | D | H | B | U |   | W | f |
|  | D7 |   |   | y | Δ | g | e | j | k | ' |   | q | z | p | x | ; | , | v |   | . | f |
|  | D8 |   |   | Y | Δ | G | E | J | K | " |   | Q | Z | P | X | : | < | V |   | > | f |
|  | D9 | ? |   |   | Δ | ( | ) |   |   |   |   |   |   |   |   |   | [ | ] |   |   | f |
|  | D10 | ? |   |   | Δ | ( | ) |   |   |   |   |   | | |   |   |   | { | } |   |   | f |
|  | D11 | 7 | 8 | 9 | Δ | / | 4 | 5 | 6 | — | * | 1 | 2 | 3 | + | = | 0 |   | . | f |

TABLE 1-continued

| Row | 1 | 1 | 1 | 1 | 2 | 2 | 2 | 2 | 2 | 3 | 3 | 3 | 3 | 3 | 4 | 4 | 4 | 4 | 4 |
|-----|---|---|---|---|---|---|---|---|---|---|---|---|---|---|---|---|---|---|---|
| Col | 2 | 3 | 4 | 5 | 1 | 2 | 3 | 4 | 5 | 1 | 2 | 3 | 4 | 5 | 1 | 2 | 3 | 4 | 5 |
| D12 | & |   | ( | Δ | ? | $ | % |   | _ | ! | @ | # |   | ~ | ) |   | . |   | ƒ |

= Return
= Tab
Δ = Delete
ƒ = Flip
= Caps Lock
§ = Space

If the user did not select a key, block 52, the CPU would then look to see if the user had selected an insertion point within the text field of the text display screen, block 56. The test field could be selected in different manners, depending on how the keyboard system is implemented. In the preferred embodiment, the user would simply touch a portion of the touch sensitive display comprising the text display area with a finger. If the keyboard was being implemented in software, so as to appear on a standard display screen and thereby interact with a cursor control device, such as a mouse, the user whould simply have to click within the text display portion of the display. If the user did not select a position within the text field, the CPU 32 would then go back to waiting. If the user did select a position within the text field, a select signal indicating the insertion point, and thereby corresponding to the preceding character in the text, would be sent to the CPU. The CPU would then proceed to block 90, which is further described below.

The present invention could also be implemented for use in computer systems such as the Macintosh ® computers manufactured by Apple Computer, Inc., of Cupertino, Calif., which use special functional icons, buttons or keys, such as "control" and "option", in combination with character keys, to perform certain special computer functions. As depicted in FIGS. 1 and 3, such functionality is provided in the present invention through the Control and Option buttons 20 and 22 of the preferred embodiment, which are implemented as momentary contact hardware buttons, like on any Macintosh computer. To implement a control or option command, the user must be holding down either the Control or Option button while the desired key is selected. Option and Control buttons, like any key, could also be implemented as a portion of an interactive display which could be selected by a cursor or a user's finger. In such instances, the option or control functions would then apply to the next character or combination of characters selected by the user.

Returning now to block 54, once the variable CHAR has been set, the CPU then looks to see whether the Control button 20 was depressed at the time the key was selected, block 60. If the Control button 20 was down, a CONTROL CHAR is sent to the control handler of the CPU, block 62. If the Control button was not down, the CPU looks to see if the Option button 22 was down, block 64, and if it was, sends an OPTION CHAR to the option handler of the CPU. If neither button was down when the key was selected, the CPU moves on to determine which character set should be displayed in response to the selected key.

If the selected key was the Shift key, block 68, the CPU looks to see if the value CAPLOCKED is true, block 70. In the preferred embodiment, the Shift key is being reated as a "sticky shift" instead of a momentary contact button. To type an uppercase character, the user need only press the Shift key and let go, whereupon the character set layout for the combination of characters will change to uppercase versions of the characters shownl. Upon selection of a character, the layout is reset to display lowercase characters. If the user selects the Shift key again, the character set layout is toggled back to the prior layout. The Caps Lock key 46 sets the CAPLOCKED variable to true and the character set layouts of the keyboard to uppercase for all characters entered until the uses presses the Caps Lock key again. For this reason, the Shift key has no effect when CAPLOCKED is true.

Returning now to block 70, if the condition CAPLOCKED is true, the system goes back to waiting, block 50, because selecting the Shift key when CAPLOCKED is true is not supposed to have any effect. If CAPLOCKED is not true, the CPU determines which character set layout to display from Table 2, set out below, and displays that layout in the character set display screen, block 72. Table 2 represents a look-up table stored in memory 36 illustrating which character set layout is to be displayed after a user presses a Shift key or button.

TABLE 2

| CURRENT LAYOUT | NEW LAYOUT AFTER SHIFT |
|---|---|
| D1 | D2 |
| D2 | D1 |
| D3 | D4 |
| D4 | D3 |
| D5 | D6 |
| D6 | D5 |
| D7 | D8 |
| D8 | D7 |
| D9 | D10 |
| D10 | D9 |
| D11 | D12 |
| D12 | D11 |

If the selected key was not the Shift key, the CPU looks to see if the selected key was the Flip key, block 74. If the selected key was the Flip key, the CPU looks to see if the CAPLOCKED condition is true, block 76. If CAPLOCKED is not true, the CPU determines which character set layout to display from Table 3, set out below, and displays that layout in the character set display screen, block 78. Table 3 represents a look-up table stored in memory 36 illustrating which character set layout is to be displayed after a user presser the Flip key.

TABLE 3

| CURRENT LAYOUT | NEW LAYOUT AFTER FLIP |
|---|---|
| D1 | D3 |
| D2 | D4 |
| D3 | D11 |
| D4 | D11 |
| D5 | D7 |
| D6 | D8 |
| D7 | D11 |

TABLE 3-continued

| CURRENT LAYOUT | NEW LAYOUT AFTER FLIP |
| --- | --- |
| D8 | D11 |
| D9 | D5 |
| D10 | D5 |
| D11 | D9 |
| D12 | D9 |

If CAPLOCKED is true, the CPU refers to look-up Table 4, also stored in memory 36, to determine which layout should be displayed when CAPLOCKED is true and the user selects the Flip key, block 80.

TABLE 4

| CURRENT LAYOUT | NEW LAYOUT W/ CAPLOCKED TRUE |
| --- | --- |
| D1 | D2 |
| D2 | D2 |
| D3 | D4 |
| D4 | D4 |
| D5 | D6 |
| D6 | D6 |
| D7 | D8 |
| D8 | D8 |
| D9 | D9 |
| D10 | D9 |
| D11 | D11 |
| D12 | D12 |

FIG. 5 is a continuation of the flow chart illustrated in FIG. 4 and further illustrates the deletion of characters and the toggling of the Caps Lock key. If the selected key was not the Flip key, block 74, the CPU looks to see if CHAR is set to Delete, block 86, meaning the user has selected the Delete key. If CHAR is set to delete, the previously typed character within the text display screen, that character to the right of the insertion point or cursor, will then be deleted from the screen, block 88, and the variable INSERT CHAR will be set to nil, block 90. If the user has selected an insertion point, block 56, the variable INSERT CHAR is also set to nil, block 90. To determine which character set layout to display after deleting a character or selecting an insertion point in the text field, the CPU looks to see if the there is text before the cursor position or insertion point, block 92. If there is text before this point, CHAR is set ot a value corresponding to the text character being displayed before the insertion point, block 94. If there is no text before the insertion point, CHAR is set to Space, block 96, so as to initiate the display of one of the character set layouts. After the variable CHAR has been set in either blocks 94 or 96, the system moves on to block 106 of FIG. 5.

If CHAR was not set to Delete, the CPU looks to see if CHAR is set to Caps Lock, block 98. If CHAR is set to Caps Lock, the CPU checks to see if CAPLOCKED is already true, block 100. If CAPLOCKED is true, the CPU sets CAPLOCKED to false, block 102, and then sets INSERTCHAR to nil, block 90. If CAPLOCKED is false, the CPU sets CAPLOCKED to true, block 104, and then sets INSERTCHAR is set to nil, block 90. If CHAR was not set to Caps Lock, the CPU set INSERTCHAR to the value of CHAR, block 105, in preparation for inserting the value of CHAR into the text buffer.

FIG. 6 is a continuation of the flow chart illustrated in FIGS. 4 and 5 and further illustrates how particular character set layouts are predictively selected for display within the character set display screen. If CHAR is set to either Space, Return, Single-Quote, Double-Quote, or Tab, or is in the set "AEIOUaeiour()", block 106, and CAPLOCKED is false, block 108, then layout D5 is displayed, block 110. But, if CAPLOCKED is true, block 108, then layout D6 is displayed, block 112. If CHAR is not set to any of the characters of block 106, then the CPU looks to see if CHAR is in the set "0123456789+ −/*=", block 116, and if it is, displays layout D11, block 118. If CHAr is set to anything other than the characters of blocks 106 and 116, and if CAPLOCKED is true, block 120, then layout D2 is displayed, block 122. But, if CAPLOCKED is false, then layout D1 is displayed, block 124.

After determining and displaying the next layout, the CPU checks to make sure that INSERTCHAR is not set to nil, block 126. If INSERTCHAR is set to nil, meaning nothing is to be put into the text, the system goes back to waiting, block 50. If INSERTCHAR is set to anything but nil, the character corresponding to the value of INSERTCHAR is displayed in the text field of the text display screen. After inserting the character into the text, the system returns to its wait state, block 50.

Although the present invention has been described with reference to FIGS. 1–6 and with emphasis on a particular embodiment, it should be understood that the figures are for illustration only and should not be taken as limitations upon the invention. It is contemplated that many changes and modifications may be made by person of ordinary skill in the art to the elements, process and arrangement of elements or steps of the invention without departing from the spirit and scope of the invention as disclosed above.

I claim:

1. A dynamic predictive keyboard for communicating information to a display, comprising:

an input means for use in combination with a plurality of key images and operative to output select signals corresponding to said key images in response to one or more of said key images being selected with said input means by a user, each of said select signals corresponding to an action to be taken by said keyboard and/or a device in communication with said keyboard;

predictive means for determining a set of said key images to use in combination with said input means in response to receipt of one or more of said select signals, said set of key images including at least one key image most likely to be next selected by said user; and means for displaying said key images in association with said input means.

2. A dynamic predictive keyboard as recited in claim 1, wherein said displaying means is operative to project said key images on said display.

3. A dynamic predictive keyboard as recited in claim 2, wherein said input means includes a touch sensitive screen overlaying said display.

4. A dynamic predictive keyboard as recited in claim 2, wherein said input means includes a pointing device operated in associated with said display.

5. A dynamic predictive keyboard as recited in claim 1, wherein said input means includes a plurality of key switches, wherein said displaying means includes a plurality of display elements associated with each of sai key switches, and wherein said displaying means is operative to project said key images within said display elements.

6. A dynamic predictive keyboard as recited in claim 1, wherein said input means includes a plurality of key switches, wherein and said displaying means is operative to project replicas of said key switches on said display, and wherein said displaying means is operative to project said key images within said replicas, whereby said user selects one of said key images by selecting a corresponding key switch.

7. A dynamic predictive keyboard as recited in claim 1, wherein said input means includes a plurality of key switches, and wherein said input means further includes means for variably arranging said key switches in a predefined configuration.

8. A dynamic predictive keyboard as recited in claim 1, wherein said means for displaying said key images includes means for variably arranging said key images to be displayed according to a statiscal analysis of key images selected over a first period.

9. A dynamic predictive keyboard as recited in claim 1, wherein said key images include text characters corresponding to letters and characters for writing in a particular language.

10. A dynamic predictive keyboard as recited in claim 9, wherein said input means includes a plurality of user selectable keys having fixed key locations, and wherein each of said key images is associated with only a single key location, whereby key locations associated with said key images are learned by said user in such a manner so as to facilitate touch typing using said keyboard.

11. A dynamic predictive keyboard as recited in claim 9, wherein said key images further include functional icons corresponding to actions to be taken by said keyboard and/or said device.

12. A dynamic predictive keyboard as recited in claim 11, wherein one of said function icons corresponds to an action for switcing said key images from lower case text characters to upper case text characters.

13. A dynamic predictive keyboard as recited in claim 11, wherein said displaying means is operative to project said text characters on said display, and wherein one of said functional icons corresponds to an action for causing said displaying means to delete one or more of said text characters projected on said display.

14. A dynamic predictive keyboard as recited in claim 11, wherein one of said functional icons corresponds to an action for causing said displaying means to manually switch between sets of said key images.

15. A dynamic predictive keyboard as recited in claim 1, wherein said predictive means includes a set of rules for defining a set of key images to use in combination with said input means in response to each of said select signals.

16. A dynamic predictive keyboard as recited in claim 15, wherein said key images include text characters corresponding to letters and characters for writing in a particular language, and wherein said set of rules is based on said language.

17. A dynamic predictive keyboard as recited in claim 16, wherein said input means further including means for selecting an insertion point for text characters on said display, said input means being operative to output a select signal corresponding to a text character preceding said insertion point, and wherein set of rules includes a rule for defining a set of key images to use in combination with said input means in response to each of said select signals.

18. A dynamic predictive keyboard as recited in claim 16, wherein said set of rules includes a rule for defining a set of key images to use in combination with said input means in response to one of said text characters being deleted from said display.

19. A dynamic predictive keyboard as recited in claim 15, wherein said set of rules includes a rule for defining a set of key images to use in combination with said input means in response to an operation performed by said device.

20. A dynamic predictive keyboard as recited in claim 15, wherein said set of rules is modifiable according to feedback data derived from said keyboard and/or said device.

21. A dynamic predictive keyboard as recited in claim 20, wherein said feedback data is statistically derived based on key images selected by said user.

22. A dynamic predictive keyboard as recited in claim 20, wherein said feedback data is based on operations performed by said device.

23. A dynamic predictive keyboard as recited in claim 15, wherein said set of rules includes a rule for defining a set of key images to use in combination with said input means in response to each text character selected by said user.

24. A dynamic predictive keyboard as recited in claim 15, wherein said key images include text characters corresponding to letters and characters for writing in a particular language and functional icons corresponding to commands for performing predefined operations, wherein said set of rules includes a rule for defining a set of key images to use in combination with said input means in response to combinations of said text characters and/or said functional icons simultaneously being selected by said user.

25. A dynamic predictive keyboard as recited in claim 15, wherein said key images include text characters corresponding to letters and characters for writing in a particular language and functional icons corresponding to commands for performing predefined operations, wherein said set of rules includes a rule for defining a set of key images to use in combination with said input means in response to a series of said text characters and/or said functional icons being selected by said user.

26. A method for operating a keyboard for entering text on a display, comprising the steps of:
displaying a first set of key images associated with a plurality of keys, said key images including text characters, said key images corresponding to actions to be taken by said keyboard and/or said display in response to one or more of said keys being selected by a user,
detecting said user's selection of a key on said keyboard or an insertion point on said display,
determining a best set of key images to next display based on said user's selection of one or more keys from said keyboard or based on a text character on said display preceding said insertion point, said best set of key images including at least one key image most likely to be next selected by said user, and
displaying said best set of key images in association with said keys.

27. A method for operating a keyboard as recited in claim 26, wherein said key images are displayed within said keys.

28. A method for operating a keyboard as recited in claim 26, wherein said keys are key replicas displayed on said display and said key images are displayed within said key replicas.

29. A method for operating a keyboard as recited in claim 26, wherein said actions include displaying a text character on said display in accordance with a key image selected by said user.

30. A method for operating a keyboard as recited in claim 26, wherein said step of determining a best set of key images to next display includes the step of switching between sets of said key images in association with said keys.

31. A method for operating a keyboard as recited in claim 30, wherein said step of switching between said sets of key images includes the step of following a set of rules for predictively switching between said sets of key images.

32. A method for operating a keyboard as recited in claim 31, wherein said set of rules is based on a language entered from said keyboard and/or an application performed by a computerized device in association with said display.

33. A method for operating a keyboard as recited in claim 31, wherein said set of rules is modified after said keyboard is used according to feedback data derived from said keyboard and/or a computerized device operated in association with said display.

34. A method for operating a keyboard as recited in claim 33, wherein said feedback data is statistically derived based on key images selected by said user.

35. A method for operating a keyboard as recited in claim 33, wherein said feedback data is based on actions taken by said computerized device.

36. A method for operating a keyboard as recited in claim 31, wherein said set of rules includes a rule for determining said best set of key images in response to said user deleting a text character from said display.

37. A method for operating a keyboard as recited in claim 31, wherein said set of rules includes a rule for determining said best set of key images in response to each text character selected by said user.

38. A method for operating a keyboard as recited in claim 31 wherein said key images include text characters corresponding to letters and characters for writing in a particular language and functional icons corresponding to commands for performing predefined operations, wherein said set of rules includes a rule for determining said best set of key images in response to combinations of said text characters and/or said functional icons simultaneously being selected by said user.

39. A method for operating a keyboard as recited in claim 31, wherein said key images include text characters corresponding to letters and characters for writing in a particular language and functional icons corresponding to commands for performing predefined operations, wherein said set of rules includes a rule for determining said best set of key images in response to a series of said text characters and/or said functional icons being selected by said user.

40. A dynamic predictive keyboard and display device, comprising:
a display,
a set of user selectable keys arranged within a predetermined configuration,
a housing for securing said display and said keys,
means for determining a set of key images to display in association with said keys after one or more of said keys has been selected by said user, each of said key images corresponding to an action to be taken by said device in response to one or more of said keys being selected by a user, said set of key images including at least one key image most likely to be next selected by said user, and
means for displaying said set of key images in association with said keys.

41. A dynamic predictive keyboard and display device as recited in claim 40, wherein said key images are projected by said displaying means on said display.

42. A dynamic predictive keyboard and display device as recited in claim 41, wherein said keys are formed by a touch sensitive screen overlaying a portion of said display displaying said key images.

43. A dynamic predictive keyboard and display device as recited in claim 40, wherein said keys are hardware switches, wherein said displaying means includes a plurality of display elements associated with each of said keys, and wherein said displaying means includes means for displaying said key images within said display elements.

44. A dynamic predictive keyboard and display device as recited in claim 40, wherein each of said key images is displayed in association with only one key, whereby a key location associated with each of said key images is learned by said user thereby facilitating touch typing using said keyboard.

45. A dynamic predictive keyboard and display device as recited in claim 40, wherein said actions to be taken by said device include displaying text characters on a display screen.

46. A dynamic predictive keyboard and display device as recited in claim 40, wherein said determining means includes means for storing a plurality of said key images and wherein said display means includes means for alternatively displaying different sets of said key images in association with said keys.

47. A dynamic predictive keyboard and display device as recited in claim 46, wherein said means for alternatively displaying includes means for manually switching between said different sets of said key images.

48. A dynamic predictive keyboard and display device as recited in claim 40, wherein said determining means includes a set of rules for determining said set of key images.

49. A dynamic predictive keyboard and display device as recited in claim 48, wherein said set of rules is based on a language being typed from said keyboard and/or an application being performed by said device.

50. A dynamic predictive keyboard and display device as recited in claim 48, wherein said key images include text characters, and wherein said set of rules includes a rule for causing said set of key images to be displayed in association with said keys in response to said user selecting an insertion point for text characters on said display screen.

51. A dynamic predictive keyboard and display device as recited in claim 48, wherein said key images include text characters, and wherein said set of rules includes a rule for causing said set of key images to be displayed in association with said keys in response to said user deleting a text character from said display screen.

52. A dynamic predictive keyboard and display device as recited in claim 48, wherein said set of rules includes a rule for causing said set of key images to be displayed in association with said keys in response to an operation performed by said device.

53. A dynamic predictive keyboard and display device as recited in claim 48, wherein said set of rules is initially predefined before said keyboard is used and subsequently modified after said keyboard is used according to feedback data derived from said device.

54. A dynamic predictive keyboard and display device as recited in claim 53, wherein said feedback data is statistically derived based on key images selected by said user.

55. A dynamic predictive keyboard and display device as recited in claim 53, wherein said feedback data is based on actions taken by said device.

56. A dynamic predictive keyboard and display device as recited in claim 48, wherein said key images include text characters, and wherein said set of rules includes a rule for causing said set of key images to be displayed in association with said keys in response to each text character selected by said user.

57. A dynamic predictive keyboard and display device as recited in claim 48, wherein said key images include text characters corresponding to letters and characters for writing in a particular language and functional icons corresponding to commands for performing predefined operations, and wherein said set of rules includes a rule for causing said set of key images to be displayed in association with said keys in response to combinations of said text characters and/or said functional icons simultaneously being selected by said user.

58. A dynamic predictive keyboard and display device as recited in claim 48, wherein said key images include text characters corresponding to letters and characters for writing in a particular language and functional icons corresponding to commands for performing predefined operations, and wherein said set of rules for includes a rule causing said set of key images to be displayed in association with said keys in response to a predefined series of said text characters and/or said functional icons being selected by said user.

59. A dynamic predictive keyboard and display device as recited in claim 40, and further including at least one user selectable function button supported by said housing and in communication with said determining means, said keys and said button being simultaneously selectable by said user in such a manner so as to cause said device to perform a special action, said special action being different than said action that would be performed had one or more keys been pressed without simultaneously pressing said button.

* * * * *

UNITED STATES PATENT AND TRADEMARK OFFICE
CERTIFICATE OF CORRECTION

PATENT NO. : 5,128,672

DATED : July 7, 1992

INVENTOR(S) : Edwin B. Kaehler

It is certified that error appears in the above-identified patent and that said Letters Patent is hereby corrected as shown below:

In the claims:

Claim 4, column 12, line 60, "associated" should read - -association - -.
Claim 5, column 12, line 65, "sai" should read -- said --.
Claim 6, column 13, line 3, please delete "and".

Signed and Sealed this

Second Day of March, 1999

Attest:

Q. TODD DICKINSON

*Attesting Officer*  *Acting Commissioner of Patents and Trademarks*